Figure 1:
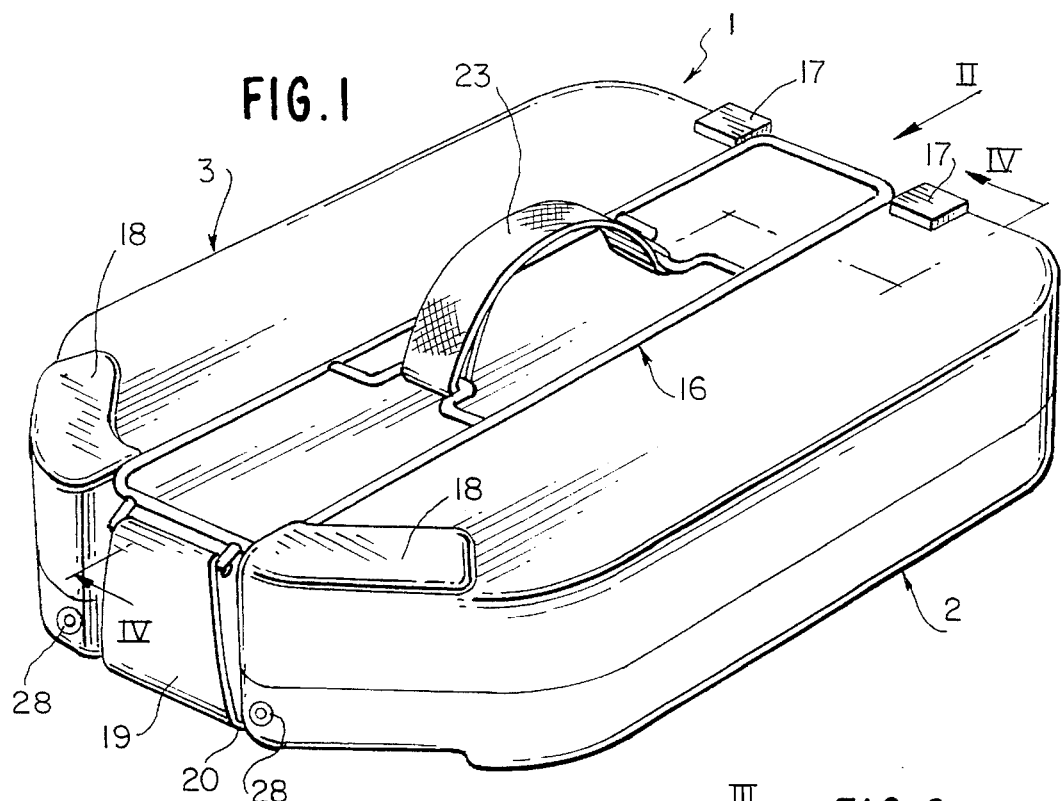

United States Patent [19]

Monetti

[11] Patent Number: 5,497,883

[45] Date of Patent: Mar. 12, 1996

[54] WARM FOOD ISOTHERMAL CONTAINER, PARTICULARLY FOR COLLECTIVE CATERING

[75] Inventor: Giovanni Monetti, Manta di Saluzzo, Italy

[73] Assignee: Monetti S.p.A., Cuneo, Italy

[21] Appl. No.: 368,015

[22] Filed: Jan. 3, 1995

[30] Foreign Application Priority Data

Feb. 22, 1994 [IT] Italy .................. TO94A0108

[51] Int. Cl.$^6$ .................................................. A45C 11/20
[52] U.S. Cl. .................. 206/545; 206/549; 219/387; 220/308; 220/318; 294/166
[58] Field of Search .................. 206/541, 545, 206/546, 549; 219/386, 387; 220/23.6, 23.8, 308, 318, 326; 294/145, 165, 166

[56] References Cited

U.S. PATENT DOCUMENTS

| | | | |
|---|---|---|---|
| Re. 25,530 | 3/1964 | King, III | 206/545 |
| Re. 30,962 | 6/1982 | Bridges | 206/545 |
| 2,135,225 | 11/1938 | Sladky | 220/318 |
| 2,436,097 | 2/1948 | Clarke | 206/541 |
| 2,679,244 | 5/1954 | Fucci | 206/545 |
| 3,312,373 | 4/1967 | Gentry | 220/318 |
| 3,746,837 | 7/1973 | Frey et al. | 219/387 |
| 3,799,386 | 3/1974 | Madalin et al. | 220/23.8 |
| 3,974,358 | 8/1976 | Goltsos | 206/541 |
| 5,016,756 | 5/1991 | Wischhusen et al. | 206/546 |

*Primary Examiner*—Jimmy G. Foster
*Attorney, Agent, or Firm*—Sughrue, Mion, Zinn, Macpeak & Seas

[57] ABSTRACT

An isothermal container for warm foodstuffs, comprising a tray of thermally insulating material provided with recesses housing respective food vessels, and a cover of thermally insulating material detachably secured onto the tray. For each of the food vessels a respective rigid covering member is provided for, having an annular soft sealing gasket formed with integral resilient thrust projections. The tray further incorporates an electric-heating-resistor thermoregulation system, and is equipped with a transport basket, having a handle and to which a forced closure member of the cover relative to the tray is anchored.

8 Claims, 4 Drawing Sheets

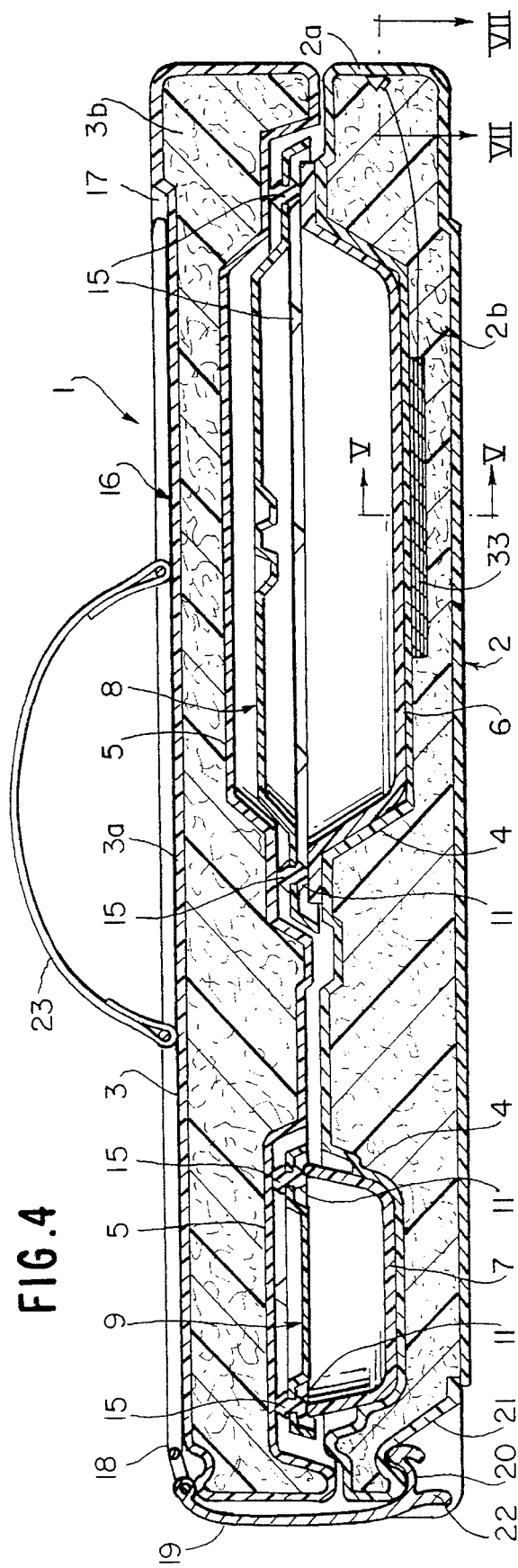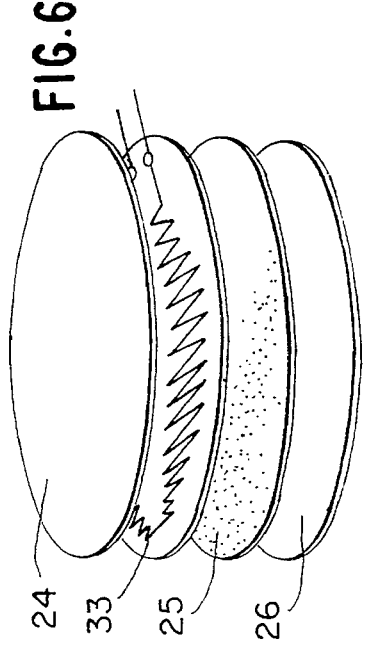

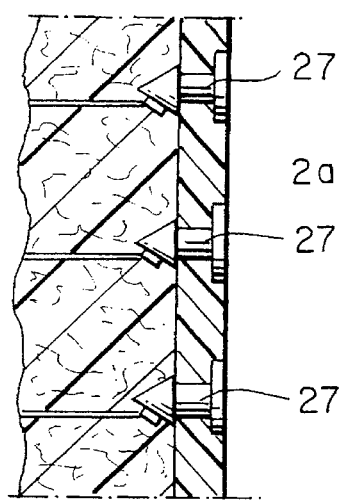
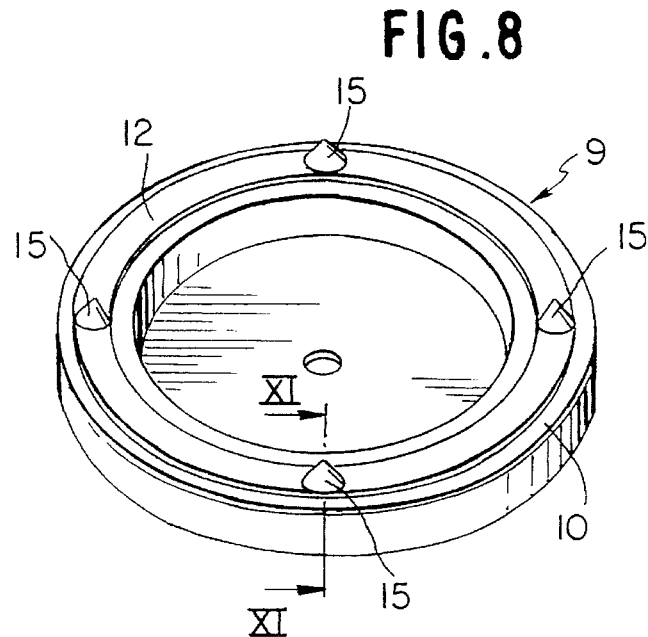
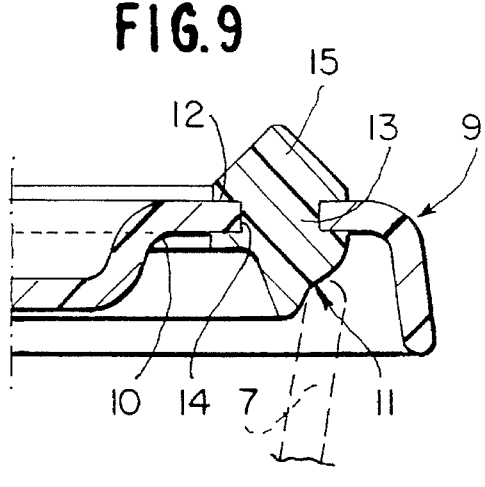
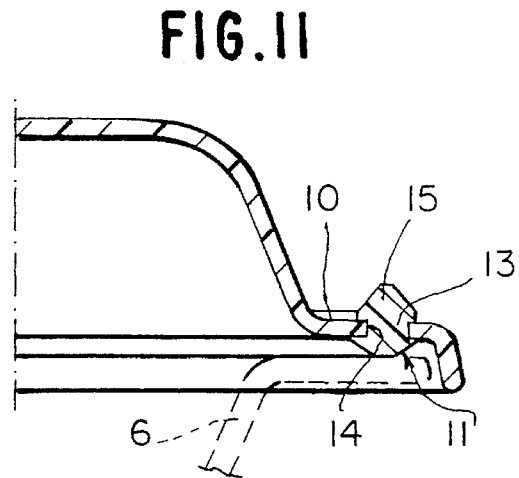

WARM FOOD ISOTHERMAL CONTAINER, PARTICULARLY FOR COLLECTIVE CATERING

The present invention is related to isothermal containers for the distribution of warm foodstuffs, particularly but not exclusively in the field of collective catering, comprising a tray made of a thermally insulating material provided with recesses housing therein respective vessels for containing foodstuffs, at least in part warm, and a cover made of a thermally insulating material detachably applied onto the tray.

Isothermal containers of the above referenced type are presently manufactured and marketed by the Applicant: they provide the ideal solution to the various packaging and distribution requirements of single complete meals, further performing the function of a support when the meal is being taken. These containers are particularly advantageous whenever it is necessary to manage single meals in places which are decentralized from the food cooking installations, such as in the case of hospitals, hotels, congress places, yards, camps, factories etc. Moreover, using these isothermal containers is also particularly useful in case of domiciliary assistance to elderly and non self-sufficient people, as well as of enterprises for the delivery of warm meals at purchaser's door.

In all of the above situations the thermally insulating construction of the container enables to thermally insulate from the outer environment the warm foodstuffs contained within the respective vessels housed in the tray recesses: however, when the time between cooking of the foodstuffs and delivery of the container to the consumer is long, there is the risk that the warm food gets cool, thus jeopardizing the fragrance and the organoleptic characteristics of the food.

A further problem resides in that, if during transportation the container is not carefully maintained in a horizontal condition, the food, particularly in the case of fluid or semidense foodstuffs, may pour out from the respective vessels seated within the tray recesses.

German Utility Model n. G 93 03550 discloses an isothermal container of the above-referenced type, further comprising, for each of said vessels, a respective covering member and resilient pressing means for providing substantially hermetic closure of the covering member against the rim of the respective food vessel by virtue of the pressure applied by the cover when the latter is placed upon the tray of the container. Each covering member has a flexible or soft construction made of an elastomeric material, particularly nitrile rubber, and the resilient pressing means may be formed by integral projections of this elastomeric body. This construction revealed inadequate, mainly owing to the fact that the elastomeric body is subjected to rapid aging and consequent deterioration as well as to heat distortion. On the other hand, the covering members of elastomeric material are heavy and expensive to manufacture, and also difficult to clean after use, particularly when impregnated with oily substances and the like contained within the respective vessels.

The object of the present invention is to give an efficient and functional solution to the above-mentioned problems, and more particularly to provide an isothermal container of the type set forth at the beginning which is adapted to enable, in use, keeping substantially unchanged the temperature of the warm foodstuffs contained therein, while preventing the risk that the foodstuffs may pour out from the respective vessels housed within the tray recesses.

According to the invention, this object is achieved by virtue of an isothermal container as set forth in the above, primarily characterized in that each covering member is constituted by a rigid body of moulded plastic material having a perimetral bearing flange provided on the inner face thereof with an annular soft sealing gasket moulded over said rigid body, said annular gasket being formed with integral anchoring projections protruding upon the outer face of said perimetral flange, via axial through holes thereof, and defining said resilient pressing means.

To the aim of providing a more efficient sealing pressure between the covering members and the respective vessels, the container further conveniently comprises a releasable forced closure member of the cover onto the tray.

This closure member may conveniently be provided with a transport handle.

According to a further feature of the invention, the tray of the container incorporates a thermoregulation system comprising at least one electrical heating resistor operatively associated to at least one of said recesses and connected to terminal contact means accessible from outside of the container for connection thereof to an outer electrical supply source.

The container according to the invention may further be equipped with a transport device formed by a support having a shape complementary to that of the container and carrying a multiple contact unit cooperating with said terminal contact means, when the container is fitted within the support, and intended to be connected to said outer electrical supply source.

Said releasable forced closure member of the cover onto the tray is advantageously designed so that it can be anchored also to the transport device, as an alternative to direct anchoring thereof to the tray of the container.

Figure 2:
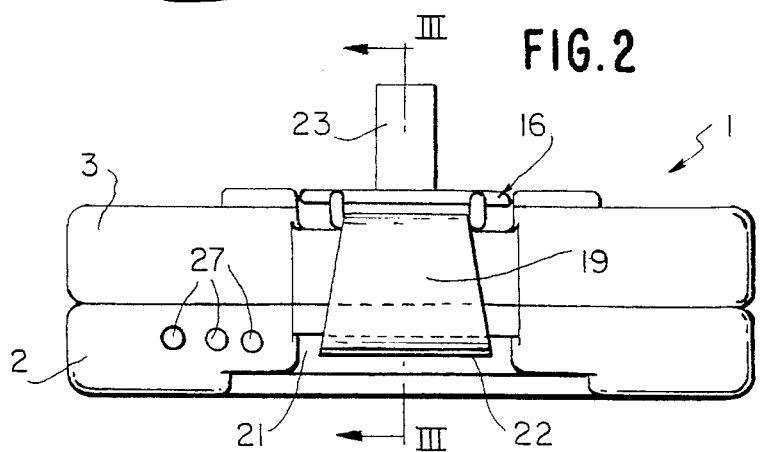
Figure 3:
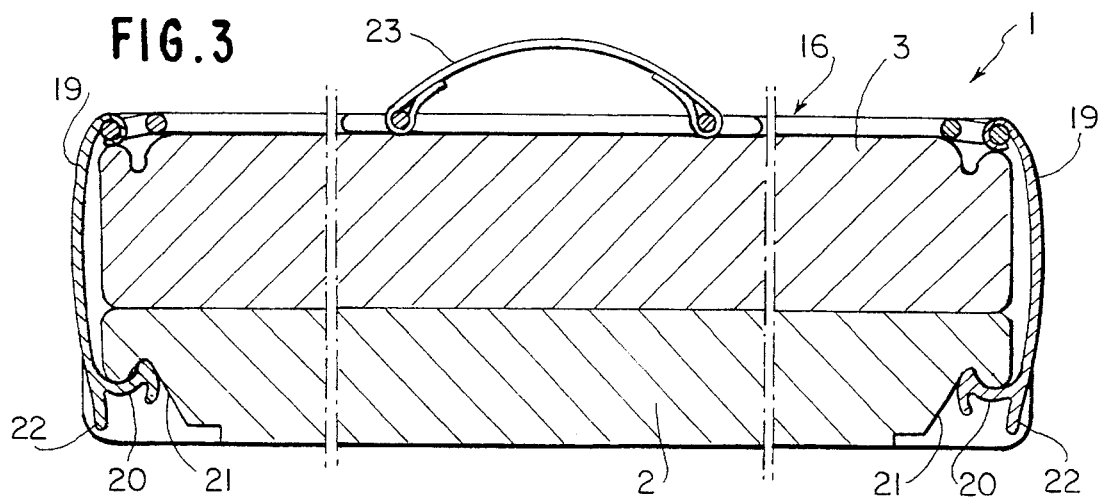
Figure 10:
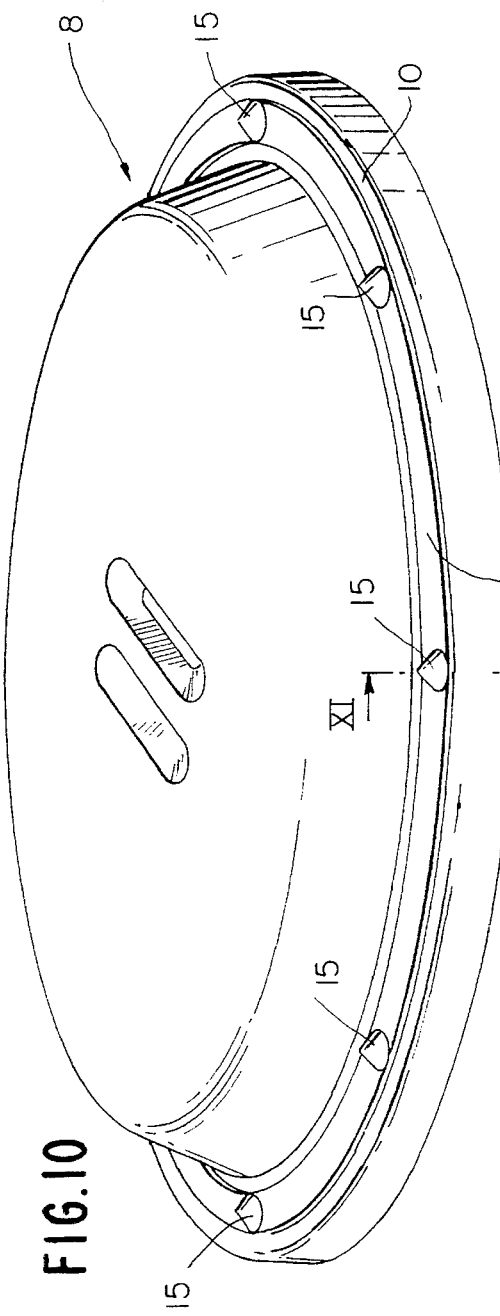
Figure 12:
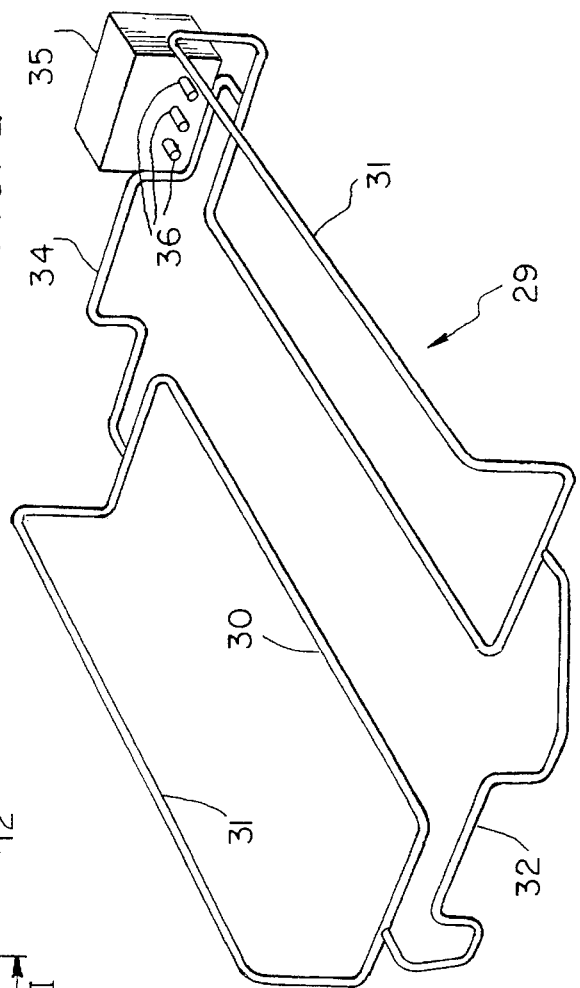
Figure 13:
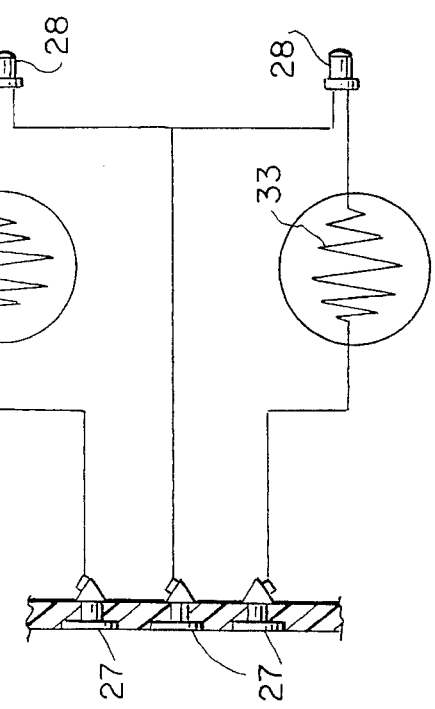

Further features and advantages of the invention will become apparent from the following detailed description, with reference to the annexed drawings purely provided by way of non-limiting example, in which:

FIG. 1 is a diagrammatic perspective view of an isothermal container according to the invention, FIG. 2 is a rear elevational view according to arrow II of FIG. 1, FIG. 3 is a cross sectioned and enlarged view along line III—III of FIG. 2, FIG. 4 is a longitudinal sectioned and enlarged view along line IV—IV of FIG. 1, FIG. 5 is a sectioned and enlarged view along line V—V of FIG. 4, FIG. 6 is an exploded perspective view of a part of FIG. 5, FIG. 7 is a sectioned and enlarged view along line VII—VII of FIG. 4, FIG. 8 is a perspective view of a first detail of the container, FIG. 9 is a sectioned and enlarged view along line IX—IX of FIG. 8, FIG. 10 is a perspective view of a second detail of the container, FIG. 11 is a sectioned and enlarged view along line IX—IX of FIG. 10, FIG. 12 is a diagrammatic perspective view showing a transport device intended to be used with the container according to the invention, and FIG. 13 diagrammatically shows the electrical circuit of the container according to the invention.

Referring initially to FIGS. 1 through 4, reference numeral 1 generally designates an isothermal container according to the invention, essentially constituted by a tray 2 and a cover 3, both having a thermally insulating construction. As shown in better detail in FIG. 4, both the tray 2 and the cover 3 are constituted by a shell 2a, 3a made of a shock-resistant and scratch-resistant plastic material for foodstuff use, formed by blow-moulding and filled with a thermally insulating foamed polyurethane 2b, 3b, respectively.

The tray 2 is formed superiorly with a number of depressed recesses 4, which can be variously distributed and sized as a function of the characteristics of the meal intended to be packaged within the container 1, and to which less deep recesses 5, formed on the lower face of the cover 3, are corresponding.

Within each recess 4 a respective foodstuff vessel is seated, which may be shaped as a soup or flat dish 6, or as a pot or cup 7.

According to a first feature of the invention, to each vessel 6, 7 a respective substantially rigid covering member 8, 9, respectively, is associated.

Referring in better detail to FIGS. 8 and 9, each covering member 9 is constituted by a rigid or semi-rigid body of moulded plastic material (normally thermoplastic polycarbonate), having a circular shape with a slightly larger size than that of the respective cup 7. The body 9 is formed with a flat bearing perimetral flange 10 provided on the inner face thereof with an annular sealing gasket 11 made of a soft plastic material, normally silicone rubber, applied onto the body 9 by means of overmoulding. In order to perform anchoring of the gasket 11 to the body 9, a perimetral band 12 of the same soft plastic material is moulded over the outer face of the perimetral flange 10, and this perimetral band 12 is joined to the gasket 11 via a plurality of integral bridges 13 extending along axial through holes 14 of the flange 10.

Each bridge 13 is projecting above the flange 10 so as to define a thrust resilient projection, whose function will be clarified herebelow.

The annular gasket 11 of the covering member 9 has an outer diameter which is slightly less than that of the upper rim of the respective cup vessel 7 (as shown with dotted lines in FIG. 9), and is conveniently formed with a substantially triangular cross section.

The covering member 8, shown in better detail in FIGS. 10 and 11, is likely constituted by a rigid or semi-rigid body of moulded plastic material, normally thermoplastic polycarbonate, also having a flat perimetral flange 10 on the inner face of which a soft plastic material annular gasket 11 is overmoulded, which is connected to an annular band 12 placed on the outer face of the flange 10 and connected thereto by means of integral bridges 13 fitted trough axial holes 14 of the flange 10 and projecting upwardly so as to define thrust integral resilient projections 15. In this case (such as shown with dotted lines in FIG. 11) the diameter of the annular gasket 11 is substantially corresponding to that of the perimetral rim of the respective dish 6.

FIG. 4 shows the applied condition of the covering members 8 and 9 onto the respective vessels 6 and 7, with the cover 3 being in the closed condition upon the tray 2. In such a condition the peripheral surfaces of the recesses 5 in the cover 3 press against the thrust resilient projections 15 of the covering members 8 and 9, thus keeping the latter under pressure contact against the respective vessels 6 and 7. It is therefore achieved in the first case a substantially hermetic pressure front contact between the gasket 11 of the covering member 8 and the rim of the dish 6, and in the second case a substantially hermetic pressure lateral contact between the gasket 11 of the covering member 9 and the inner surface of the rim of the respective cup 7. In the second case the substantially triangular cross section of the gasket 11 makes sealing engagement thereof within the rim of the cup 7 more efficient.

The pressure contact provided by the cover 3 can be obtained simply by gravity or, more conveniently, employing a releasable forced closure member of the cover 3 onto the tray 2. As shown in better detail in FIGS. 1, 3 and 4, the forced closure member may comprise an elongated element 16 arranged longitudinally upon the cover 3, between end protrusions 17 and 18 thereof, and having two articulated terminal members 19 formed lowerly with respective coupling teeth 20 snap fitted within corresponding complementary seats 21 of the tray 2. Close to the two coupling teeth 20, the two articulated members 19 have respective release appendages 22.

The closure member 16 is further provided centrally with a transport handle 23.

According to another feature of the invention, the tray 2 of the container 1 incorporates a thermoregulation system which is adapted to be supplied by an outer electrical source so as to keep substantially unchanged over the time the temperature of the warm foodstuffs contained therein.

This thermoregulation system includes at least one electrical film resistor 33 (FIGS. 4, 5 and 6) fitted beneath the bottom of a corresponding recess 4 containing a respective vessel (dish 6 or cup 7) for a warm foodstuff. In the case of a Mediterranean diet meal, the tray 2 normally incorporates (as in the shown example) two such resistors 33: it is however evident that different arrangements are comprised within the present invention.

As shown in better detail in FIGS. 5 and 6, each heating resistor 33 is arranged between two thin bi-adhesive adhesive material sheets of which the upper one, indicated as 24, is securing the resistor 33 under the bottom of the recess 4, and the lower one, indicated as 25, is adhering to a protective sheet 26 of cardboard or like material.

FIG. 13 shows the wiring diagram of the thermoregulation system, assuming that two heating resistors 33 are employed: the circuit simply comprises electric wires connecting the resistors 33 to respective terminal contacts 27 constituted by conductive elements placed on the surface of one end of the tray 2. A third identical conductive element 27 is connected to a pair of display LEDs 28, arranged at the opposite side of the tray 2 (FIG. 1) and intended to display the energized condition of the respective resistors 33.

For the electrical supply of the thermoregulation system, a collective transport device for a number of isothermal containers 1 may be provided for, which is for instance constituted by a carriage having a plurality of compartments (not shown since disclosed in a co-pending patent application filed on the same day by the same Applicant), or a transport device for the isothermal container 1 alone may be envisaged. A transport device of the latter kind is generally designated as 29 in FIG. 13, and is constituted by a basket of metal wire defining a base 30, two lateral sides 31, a front retainer 32 and a back retainer 34, defining a receptacle having a shape complementary to that of the container 1. The base 30 supports, in proximity of the back retainer 34, a control assembly 35 having a multiple contact unit 36 formed by a triad of electrically conductive pins, arranged same as the contact elements 26 and slidable against the action of respective thrust springs (not shown in the drawings).

The control assembly 35 comprises switches and a visual display for the control of the electrical supply and joint and/or separate activation/disactivation of the heating resistors 33. This control assembly 35 is also provided with a connecting plug (not shown) for the connection thereof, through an electrical wire, to an outer socket for direct current supply. This socket may be constituted, for instance, by a cigarette-lighter socket of a motor vehicle.

The arrangement of the front retainer 32 and of the back retainer 34 is such that same can be directly engaged by the articulated element 19 of the closure member 16 so as to maintain, when the container 11 is fitted within the support 29, the closure pressure of the cover 3 onto the tray 2 during transport, by means of the handle 23, of the whole container 1/support 29 assembly.

The arrangement of the support basket 29 is further such as to enable stacking of a plurality of container 1/support 29 assemblies in a superimposed condition.

Naturally the details of construction and the embodiments may be widely varied with respect to what has been disclosed and illustrated, without thereby departing from the scope of the present invention, such as defined in the appended claims.

What is claimed is:

1. A warm food isothermal container, particularly for collective catering, comprising a tray made of a thermally insulating material provided with recesses housing therein respective vessels for containing foodstuffs, at least in part warm, each vessel having a respective rim, and a cover made of a thermally insulating material detachably applied onto the tray, and further comprising, for each of said vessels, a respective covering member and resilient pressing means for providing substantially hermetic closure of said covering member against the rim of the respective food vessel by virtue of the pressure applied by the cover when the latter is placed upon the tray of the container, and wherein each covering member is constituted by a rigid body of moulded plastic material having a perimetral bearing flange with an inner face provided with an annular soft sealing gasket moulded over said rigid body, said annular gasket being formed with integral anchoring projections protruding upon the outer face of said perimetral flange, via axial through holes thereof, and defining said resilient pressing means.

2. Container according to claim 1, further comprising a releasable forced closure member of the cover on the tray.

3. Container according to claim 2, wherein said forced closure member comprises an elongated member resting upon the cover and having two hook-like articulated end elements adapted to snap fit within two complementary end seats of the tray.

4. Container according to claim 3, wherein said elongated member is equipped with a transport handle.

5. Container according to claim 1, wherein the tray incorporates a thermoregulation system comprising at least one electrical heating resistor operatively associated to at least one of said recesses, and terminal contact means connected to said thermoregulation system and accessible from outside of the container for connection thereof to an outer electrical supply source.

6. Container according to claim 5, wherein the tray is provided with display means for indicating the energized condition of the or each electrical heating resistor.

7. Container according to claim 5, wherein said at least one electrical heating resistor is a film resistor and is fitted beneath the corresponding recess of the tray.

8. Container according to claim 5, further comprising a transport device formed by a support having a shape complementary to that of the container and carrying a multiple contact unit cooperating with said terminal contact means, when the container is fitted within said support, and adapted to be connected to said outer electrical supply source.

* * * * *